United States Patent
Travis et al.

(10) Patent No.: US 12,555,057 B2
(45) Date of Patent: Feb. 17, 2026

(54) ADAPTIVE ANALYSIS OF DIGITAL CONTRACT MODIFICATIONS

(71) Applicant: International Business Machines Corporation, Armonk, NY (US)

(72) Inventors: Amy D Travis, Arlington, MA (US); Jonathan D. Dunne, Dungarvan (IE); Alexander Mariyaswamy, Bengaluru (IN); Kartik Misra, Gurgaon (IN); Kelly Silva de Oliveira, Guarulhos (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 244 days.

(21) Appl. No.: 18/229,270

(22) Filed: Aug. 2, 2023

(65) Prior Publication Data

US 2025/0045664 A1 Feb. 6, 2025

(51) Int. Cl.
*G06Q 10/0635* (2023.01)
*G06Q 50/18* (2012.01)

(52) U.S. Cl.
CPC ......... *G06Q 10/0635* (2013.01); *G06Q 50/18* (2013.01)

(58) Field of Classification Search
None
See application file for complete search history.

(56) References Cited

U.S. PATENT DOCUMENTS

| | | | |
|---|---|---|---|
| 2014/0149175 A1* | 5/2014 | Abbott | G06Q 10/0635 705/7.28 |
| 2015/0088595 A1 | 3/2015 | Chillar et al. | |
| 2020/0143384 A1 | 5/2020 | Koontz et al. | |
| 2022/0058338 A1 | 2/2022 | Hanson et al. | |
| 2022/0261711 A1* | 8/2022 | Krishna | G06F 16/353 |
| 2022/0335553 A1* | 10/2022 | Chew | G06F 16/35 |
| 2023/0004590 A1* | 1/2023 | Li | G06N 7/01 |

OTHER PUBLICATIONS ip.com, Automatic evaluation of contractual terms, Apr. 6, 2018.
Swish Team, Machine Learning for Contracts Analysis—Put Your Human Mind Where It Really Matters, Jan. 18, 2019, https://medium.com/swishlabs/machine-learning-for-contracts-analysis-put-your-human-mind-where-it-really-matters-7cb5395c65c7.
Bourez, Contract Analysis leveraging AI—A Technical Overview, May 15, 2019, https://www.ivalua.com/blog/contract-analysis-leveraging-ai/.
Rich, How AI is Changing Contracts, Feb. 12, 2018, https://hbr.org/2018/02/how-ai-is-changing-contracts.

(Continued)

*Primary Examiner* — Stephanie Z Delich
(74) *Attorney, Agent, or Firm* — Garg Law Firm, PLLC; Rakesh Garg; Michael O'Keefe

(57) ABSTRACT

An embodiment performs, by a digital contract modification analysis engine, a modification analysis between a first digital contract and a second digital contract. The embodiment identifies, by the digital contract modification analysis engine, a modification based on the modification analysis. The embodiment determines, by the digital contract modification analysis engine based on user data associated with a user, a risk assessment of the modification.

20 Claims, 6 Drawing Sheets

(56) References Cited

OTHER PUBLICATIONS

University of Minnesota Law School, Legal Technology Tips, Tricks, & Treats 2019, 2023, https://libguides.law.umn.edu/c.php?g=884434&p=7068598.

Ross, Legal research software made for fast and in-depth research, 2023, https://www.rossintelligence.com/features.

Extractedge, AI-Powered Contract Analysis & Risk Review, 2023, https://www.edgeverve.com/artificial-intelligence/nia/nia-contracts-analysis/.

Edgeverve, AI-Powered Contracts Analysis & Risk Review, 2020, https://www.edgeverve.com/wp-content/uploads/2020/10/Nia-Contracts-Analysis-Brochure-2020.pdf.

* cited by examiner

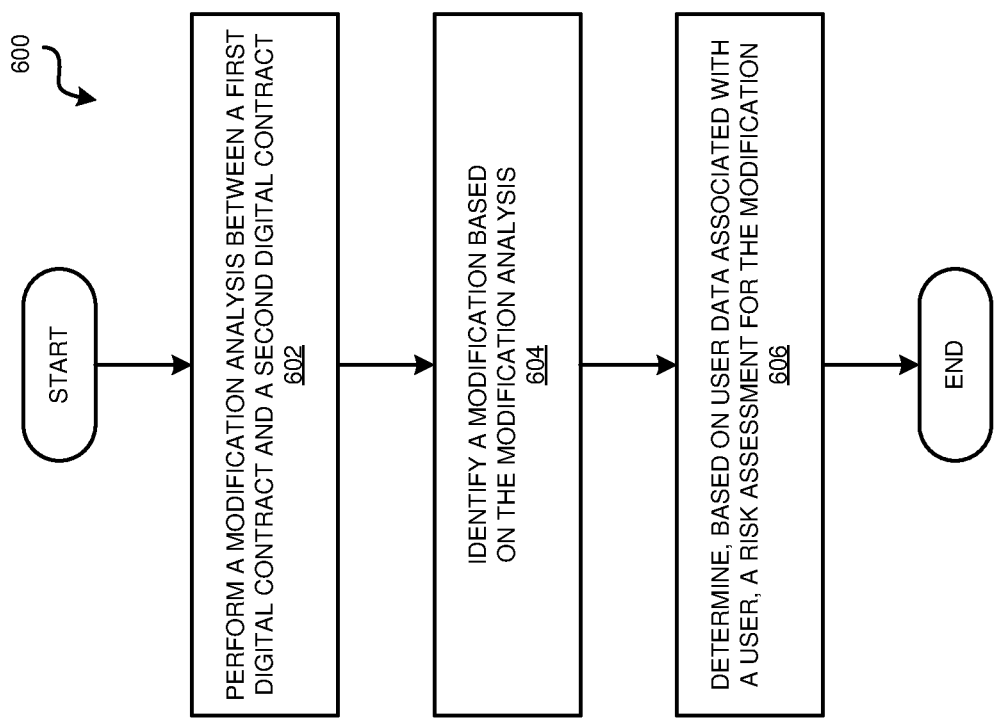

ADAPTIVE ANALYSIS OF DIGITAL CONTRACT MODIFICATIONS

BACKGROUND

The present invention relates generally to digital contracts. More particularly, the present invention relates to a method, system, and computer program for adaptive analysis of digital contract modifications.

In the digital age, the usage of digital contracts, such as terms and conditions, smart contracts, and service agreements is increasingly ubiquitous. These legal documents, which users must often agree to before availing a service or purchasing a product, provide a framework for the relationship between the user and the provider. They cover a range of issues including, but not limited to, the nature of the service or product provided, the obligations and responsibilities of each party, privacy policies, procedures for dispute resolution, and the terms for refunds or returns. These documents are usually complex, being crafted in dense legalese. The complicated nature of their syntax often makes it challenging for average users, regardless of their language proficiency, to fully comprehend what they are agreeing to. This can lead to confusion, misunderstandings, or exploitation.

Furthermore, these documents are often subject to change. Service providers might update their digital contracts periodically due to a variety of reasons such as changes in law, alterations in service or product features, or modifications in company policy. When such updates occur, users are typically required to agree to the new terms before they can continue using the service or product. However, these updates can be voluminous and challenging for users to understand. They may not be aware of how the changes affect them, which terms have been altered, or if new obligations or risks have been introduced. This uncertainty can present a significant problem, especially when changes pertain to sensitive issues like privacy rules, refund or return policies, or the imposition of penalties.

SUMMARY

The illustrative embodiments provide for adaptive analysis of digital contract modifications.

An embodiment involves performing, by a digital contract modification analysis engine, a modification analysis between a first digital contract and a second digital contract. A technical advantage of this step lies in its ability to detect and quantify the modifications between two versions of a digital contract.

The embodiment includes identifying, by the digital contract modification analysis engine, a modification based on the modification analysis. A technical advantage of this step is that it provides a way to extract and present the modifications in a concise, comprehensible format. This not only helps to highlight the key changes in the digital contracts but also facilitates understanding of how these changes might impact the terms of the contract.

The embodiment involves determining, by the digital contract modification analysis engine based on user data associated with a user, a risk assessment of the modification. A technical advantage here is that this step integrates user-specific data into the risk assessment process, leading to personalized and context-aware analysis. The user data could include preferences, interactions, and other relevant information, which allows the system to tailor the risk assessment to match the user's specific needs and concerns.

Taken together, the technical effect of this embodiment is to provide a comprehensive, automated, and user-centric system for digital contract modification analysis. This system is capable of identifying contract modifications, assessing their risk based on user-specific data, and presenting the findings in a user-friendly manner. This system not only streamlines the process of reviewing digital contract modifications but also makes it more accurate and personalized.

An embodiment includes an implementation where the first digital contract is a former version of a contract, and the second digital contract is a subsequent version of the contract. A technical advantage of this setup is that it enables users to compare different versions of the same contract over time, which is a common requirement in business and legal practice.

The embodiment proceeds with performing the modification analysis of the first and second digital contract, which includes performing a corpus linguistics analysis, a topic modeling analysis, and an inter-rater reliability analysis. These techniques provide the advantage of a comprehensive, multi-pronged approach to contract analysis. The corpus linguistics analysis helps to understand the language changes across the contracts, topic modeling identifies changes in the key subjects covered by the contracts, and the inter-rater reliability analysis evaluates the degree of agreement between different digital contracts.

An embodiment includes where performing the risk assessment includes determining a risk score associated with the modification. This risk score quantifies the potential impact of the contract modification, providing a clear, easy-to-understand metric for users. Presenting the risk score responsive to a determination that the risk score meets a risk score threshold allows for efficient prioritization of contract modifications, focusing attention on the changes that pose significant risk or impact.

An embodiment includes user data such as user location to determine the risk assessment of the modification. The advantage of this approach is that it allows for context-sensitive risk assessment. The legal implications of a contract can vary based on jurisdiction, so integrating location data enhances the accuracy and relevance of the risk assessment.

An embodiment includes determining the risk assessment of the modification using a machine learning model trained using an initial version of a contract associated with the first and second digital contract. This provides the advantage of a base-line learning, as the machine learning model begins its analysis based on an initial version of the contract.

An embodiment generates, responsive to the user interacting with an interactive tool, an explanation of the modification using the interactive tool. In one embodiment the interactive tool is a chatbot. This embodiment allows for user-friendly, on-demand, and interactive explanations of the contract modifications. This greatly enhances the accessibility and understandability of the complex contract modification analysis for a wide range of users.

An embodiment includes where the modification analysis includes a corpus linguistics analysis, a topic modeling analysis, and an inter-rater reliability analysis, and where the risk assessment includes determining a risk score associated with the modification, provides a comprehensive approach to identifying and evaluating the implications of contract modifications. This embodiment might also include an aspect where the risk score is presented when it meets a certain threshold, aiding in prioritizing modifications based on their risk scores.

This embodiment provides the general technical effect of enhancing the accuracy, comprehensiveness, and relevance of the digital contract modification analysis. It allows for improved management of contract modifications, thus reducing potential legal and operational risks associated with such modifications. The corpus linguistics analysis specifically improves the understanding of the language changes across the contracts. The topic modeling analysis specifically enhances the identification of changes in the key subjects covered by the contracts. The inter-rater reliability analysis evaluates the degree of agreement between different digital contracts. Meanwhile, the risk score quantifies the potential impact of the contract modification, aiding in decision-making processes.

An example use case for this embodiment might be in a large corporation that frequently revises its supplier contracts. In this case, the corporation's legal team can use the system to analyze the changes in the supplier contracts over time. Using the corpus linguistics, topic modeling, and inter-rater reliability analyses, the system identifies modifications and determines the risk associated with each modification. The risk score allows the team to focus on high-risk modifications that could have a significant impact on the corporation's operations or compliance. This enables the legal team to manage potential risks proactively and efficiently, enhancing the corporation's contractual practices and reducing its exposure to legal and operational risks.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 6 depicts a block diagram of an example process for adaptive analysis of digital contract modifications in accordance with an illustrative embodiment.

DETAILED DESCRIPTION

Figure 1:
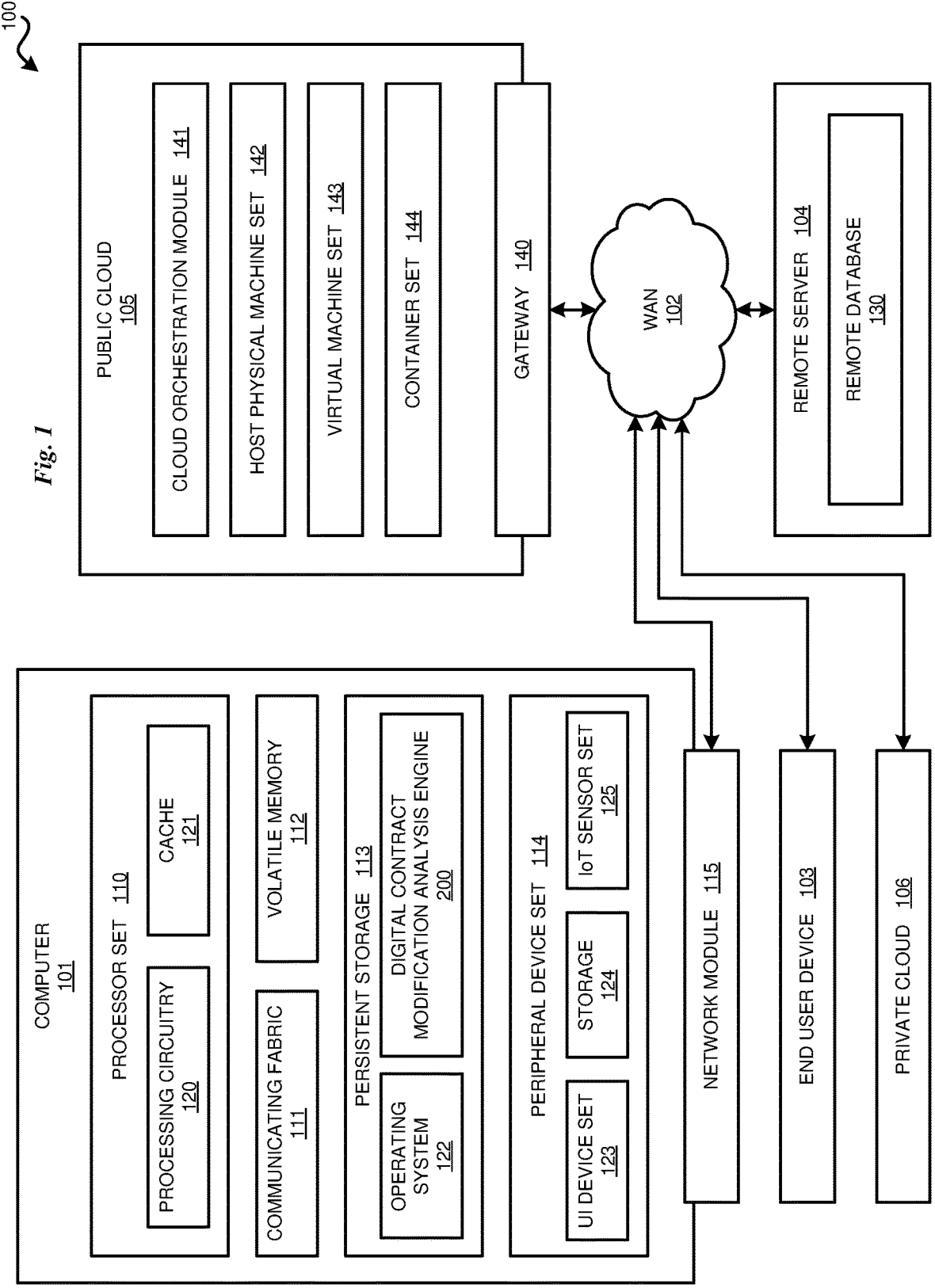
FIG. 1 depicts a block diagram of a computing environment in accordance with an illustrative embodiment.

In today's digital world, digital contracts such as terms and conditions, smart contracts, and service agreements have become a ubiquitous feature of using online platforms, products, and services. These documents often define the legal relationship between the provider of the service or product and the user. They cover a multitude of areas, including the nature of the service or product offered, the responsibilities and obligations of all involved parties, the privacy policies, dispute resolution procedures, and terms surrounding refunds or product returns. Owing to the legal nuances involved, these documents are typically composed in intricate legal jargon. Consequently, the complexity of the language used can be quite daunting, often making it difficult for the average user to fully understand the implications of what they're agreeing to, which can lead to confusion or misinterpretations.

Although many people have a tendency to gloss over these legal agreements and simply accept them to expedite their online activities, these documents are of considerable importance. In essence, by accepting a digital contract, a user is entering into a legally binding contract. This acceptance implies the user's consent to adhere to all the terms outlined therein, many of which could have significant implications for their rights and responsibilities. For instance, some terms may limit users' rights to seek redress in court, while others may grant the company broad rights to use or share users' personal information. Given the potential impacts of these digital contracts on users' rights, understanding them becomes crucial.

Furthermore, it is commonplace for providers to periodically update these terms and conditions. Such updates can stem from a variety of reasons including legal requirements, changes to the product or service, or revisions in the company's policies. When these updates occur, users are usually required to agree to the revised terms in order to continue using the product or service. However, the revised documents can often be as dense and complex, if not more, than the original ones. Moreover, they can be quite lengthy, thereby posing an even greater challenge for users trying to decipher the changes.

These frequent updates can potentially introduce new conditions or modify existing ones without the user fully realizing the implications. This lack of clarity can be particularly concerning when the changes pertain to sensitive areas such as privacy rules or refund and return policies. It could also introduce new risks or obligations that were previously not part of the agreement. Hence, there is a pressing need for an effective method to analyze, compare, and comprehend these updates. Such a solution could empower users by enhancing their understanding of how these changes might impact them, allowing them to make more informed decisions about whether to accept the updated digital contract.

While there are some tools and methods available that seek to help users understand terms and conditions, there are significant limitations to their effectiveness. For example, many of these tools tend to focus solely on summarizing the content of such documents. While this can help users grasp the general premise of the terms, it often falls short of providing a comprehensive understanding. The nuanced language used in legal documents can result in important details being overlooked or misinterpreted in a summary. Furthermore, a simple summary does not assist in the comparison between different versions of the document or between different providers, making it difficult for users to understand how changes impact their obligations or rights.

Moreover, some of these methods can be misleading as they fail to understand the context in which the keywords are used. A term that may seem concerning when taken out of context might actually be innocuous, or even beneficial, when viewed in the larger context of the document. Moreover, these techniques do not usually provide insights into the comparative risk levels of different terms or how they have changed over time. Thus, they do not offer users a comprehensive understanding of the possible implications of agreeing to the updated digital contract, leaving them inadequately informed and potentially exposed to unexpected risks or obligations.

The present disclosure addresses the deficiencies described above by providing a process, along with a system, method, and machine-readable medium, that conducts an in-depth analysis of initial and subsequent digital contracts. This analysis may involve the use of a digital contract modification model, which may be trained to determine information about digital contract modifications such as the level of change and associated risk in the updated digital contracts. This risk level may be conveyed for example through a website or mobile software component. Additionally, the system may engage with users to understand which aspects of digital contracts are most important to them, and specifically advise them if these areas have changed. Users could be alerted to changes through various mechanisms, including pop-up messages indicating what has been altered. The system may also incorporate interactive elements such as a chatbot to explain differences and field questions from users.

The illustrative embodiments provide for adaptive analysis of digital contract modifications. A "digital contract." as used herein, may refer to any form of agreement that has been or is intended to be digitally signed or accepted by two or more parties. A digital contract may set forth each party's rights and obligations, and it can take on various forms and have a wide array of implications. For example, it could be a user agreement that someone must accept before using a social media platform, an online shopping site's return policy, or a cloud storage service's data handling practice. Digital contracts may be updated or amended as the circumstances require.

A "modification" of a digital contract, as used herein, may refer to any change, amendment, or update made to the agreement after it has been initially accepted by the user. These modifications could be minor, such as a slight alteration in wording, or more substantial, such as the introduction of a new clause or the removal of an existing one. Such modifications can have an impact on the relationship between the user and the service provider. For instance, a modification of a digital contract may include changes to the terms of service, privacy policy, or user agreement. This could mean a change in how user data is handled, alterations to dispute resolution procedures, or modifications to payment terms. These modifications might affect the user's rights, responsibilities, or the services they can expect to receive.

Illustrative embodiments may include performing a modification analysis between a first digital contract and a second digital contract. A modification analysis of digital contracts may include a variety of steps and methods, as discussed herein. This process may involve, for example, machine learning algorithms, linguistics analysis techniques, topic modeling techniques, statistical analysis (e.g., inter-rated reliability analysis), and other forms of data analysis to review and analyze the modifications. The objective may be to identify a modification based on the modification analysis and understand the nature of these changes and assess their potential impacts. For example, the adaptive analysis could involve comparing the updated contract with its previous version to identify new, altered, or removed clauses. Then, based on the nature of these changes, a risk assessment could be conducted to understand how these modifications might affect the user. The results of this analysis could then be conveyed to the user in an understandable and user-friendly format, aiding them in making informed decisions regarding the updated contract.

In some embodiments, the first digital contract may be a former version of a contract, and the second digital contract may be a subsequent version of the contract. In other words, the system may compare different iterations of the same contract, specifically analyzing the evolution and changes that have occurred from one version to the next. In some other embodiments, however, the first digital contract may be the initial version of a contract, and the second digital contract may be the latest version of the contract. This analysis may enable a detailed understanding of how the contract terms, conditions, and stipulations have altered over multiple iterations, providing insights into the implications of these modifications for the involved parties.

Illustrative embodiments include performing a corpus linguistics analysis of the first digital contract and a second digital contract. This process could involve using statistical methods and/or machine learning algorithms to understand the commonalities and variations in language used across multiple contracts. For instance, corpus linguistic analysis techniques might be applied to investigate word frequency distribution in the contracts, highlighting significant changes or peculiar deviations in the use of certain terms or phrases.

Illustrative embodiments include performing a topic modeling analysis of the first digital contract and the second digital contract. This process could involve utilizing probabilistic modeling techniques, like Latent Dirichlet Allocation (LDA) and/or Gibbs sampling, to identify and classify underlying topics in the contracts. For example, the system might use LDA to detect an emerging topic related to "data breach liability" in the updated contract, which was not present in the initial version.

Illustrative embodiments include performing an inter-rater reliability analysis of the first digital contract and the second digital contract. This process could involve using statistical measures like Cohen's Kappa, cosine similarity, or Euclidean distance to calculate the agreement between the classifications or assessments of different contract versions. For instance, it could use Cohen's Kappa to quantify how consistently certain obligations or conditions are stated or implied across different versions of the contract.

Illustrative embodiments also include determining, based on user data associated with a user, a risk assessment of the modification. "Risk assessment," as used herein, may refer to the process of identifying modifications in digital contracts, analyzing how these modifications could potentially affect the interests or obligations of the parties involved (such as an end user), and evaluating the severity or significance of the potential impact. For example, a modification in a software's terms of service that introduces new data collection practices might be identified as a risk. The system could assess how much this modification could potentially impact a user's privacy and calculate a risk score accordingly. This process could allow users or other stakeholders to be informed about potential risks and make decisions accordingly, such as accepting the new terms, negotiating for changes, or discontinuing use of the service.

For example, the modification analysis might incorporate a user's data, such as preferences, profile, location, or feedback, among other information. For instance, the system could take into account the user's preferences, location, past interactions with similar contracts, or feedback on specific aspects of digital contracts. This data could be used to tailor the analysis and the resulting advice to the specific user. By considering the user's unique circumstances and preferences, the system could prioritize certain types of modifications, highlight specific areas of concern, or present the analysis in a way that is most useful for the user. For example, the system may take into account privacy laws based on the user's geographical region, which may be obtained for instance through the user's profile or a device's geolocation feature, and highlight changes that trespass on the user's rights based on their particular location. This personalized, adaptive analysis could help ensure that the user is not only informed about the changes in the contract, but is also able to understand how these changes specifically apply to their individual situation.

Illustrative embodiments provide for a calibration phase. A "calibration phase," as used herein, may refer to an analysis of a company's or service's original digital contract. To undertake this analysis, several techniques and approaches may be employed. Machine learning algorithms, for instance, can be utilized to categorize and understand complex patterns within the contractual language. Supervised learning techniques such as Naive Bayes or Support Vector Machines might be used to classify clauses based on predefined categories, while unsupervised techniques like clustering could help in identifying underlying themes or patterns. Linguistic analysis may also be employed, enabling a deep understanding of the contract's language structure. Techniques such as part-of-speech tagging or named entity recognition could be used to gain insight into the syntax and semantic elements of the contractual text. The calibration phase could also involve topic modeling, which is a type of statistical modeling used to discover abstract topics within a document. Techniques such as Latent Dirichlet Allocation (LDA) and/or Gibbs sampling could be applied to identify the main themes and topics discussed in the contract. Moreover, statistical analysis techniques, such as descriptive statistics, could be used to summarize and understand the distribution, central tendency, and variability of the contract's terms. For example, the calibration phase may also employ measures such as Cohen's Kappa, cosine similarity, or Euclidean distance, among others, to assess the level of agreement between the classifications or ratings assigned to different clauses or sections. This analysis may serve as a foundational reference for understanding, interpreting, and tracking subsequent modifications to the contract over time.

Illustrative embodiments include the derivation of a digital contract modification model based on the calibration phase. In some embodiments, for instance, determining the risk assessment of the modification may involve using a machine learning model trained using an initial version of a contract associated with the first digital contract and the second digital contract. This model could be a computational or mathematical representation that quantifies the changes linked with modifications to an initial digital contract. The model can consider various factors, such as the nature of changes, the frequency of modifications, implications of altered clauses, among others. The model might utilize data accumulated during the calibration phase to outline the trajectory of changes in a software application's terms and conditions over time and to predict potential risks of future updates.

Illustrative embodiments provide for the derivation of a digital contract modification model based on the calibration phase. The formulation of this model could commence with the extraction of data from the initial digital contract to train the model. Text data from this initial contract may be preprocessed for analysis, which could involve cleaning the text, removing stop words (e.g., commonly used words such as "the," "and," "a"), and transforming the contract into a format conducive to machine learning. This might include converting the contract into a bag-of-words or term frequency-inverse document frequency (TF-IDF) representation. Subsequently, this preprocessed data could be subjected to feature extraction, where key elements of the text data may be isolated for analysis. For instance, the differences between the initial contract and its modifications could be identified, classified, and quantified to create labels for supervised learning, or the features could be analyzed for clustering or dimensionality reduction in unsupervised learning.

Following the preprocessing and feature extraction, an array of machine learning algorithms, linguistic analysis, topic modeling, and/or statistical analysis techniques could be employed to train the model. Topic modeling techniques like Latent Dirichlet Allocation (LDA) and/or Gibbs sampling might be used to comprehend the underlying topics or themes within the initial contract and how they evolve. Techniques such as corpus linguistics could aid in understanding the nuances of the contractual language and its modifications. Additionally, statistical techniques such as Cohen's Kappa may be used to measure inter-rater agreement for textual terms in the initial digital contract and its modifications. Predictive methods like decision trees or neural networks could be employed to forecast the risk associated with specific changes in a contract. The performance of the model could be gauged using metrics like accuracy, precision, recall, or the area under the receiver operating characteristic (ROC) curve, depending on the specific task it is designed to perform. Finally, to ensure the model's robustness and generalizability, it could be validated and tested on separate modifications of the initial digital contract.

Illustrative embodiments provide for an analysis phase. An "analysis phase," as used herein, may refer to the systematic examination of two or more digital contracts to determine their modifications. A variety of advanced techniques can be employed for this examination. Machine learning algorithms may be employed to identify complex patterns and transformations between different versions of the contracts. For instance, a model trained on an initial contract may be used, as explained above. Additionally or alternatively, convolutional neural networks (CNN) or recurrent neural networks (RNN) can be used to analyze the sequential information within the contract text, recognizing intricate patterns of changes between contract versions. Linguistic analysis may also be employed. The use of techniques like dependency parsing or semantic role labeling can help elucidate the changes in the contract's language structure and meaning across versions. Additionally, techniques like sentiment analysis could be employed to discern shifts in tonality within the contract text. The analysis phase may also involve the application of topic modeling techniques. Models like Latent Dirichlet Allocation (LDA) and/or Gibbs sampling could be utilized to understand the prominent themes in the contract and how they evolve over different versions. Furthermore, the complexities of the contract text can be modeled using corpus linguistics, shedding light on changes in the use of language, phraseology, and semantics. The analysis phase could also include statistical measures like Cohen's Kappa. This measure can be used to gauge the level of agreement between different versions of the contract in terms of their categorization or rating of various clauses, accounting for the possibility of chance agreement. This could provide a quantitative insight into the consistency and variance across different contract iterations.

Illustrative embodiments provide for determining a risk score associated with a modification. A "risk score," as used herein, may refer to a quantifiable measure of the potential risks or unfavorable outcomes that could result from the changes in a digital contract. These risks could relate to issues such as increased obligations, reduced rights, potential for disputes or litigation, or any other negative implications that could arise from the contract modifications. Determining a risk score may involve analyzing the identified changes in a digital contract and assessing their potential implications based on predefined criteria or using machine learning techniques trained to recognize and assess such risks. The risk assessment could take into account various factors such as the nature of the changes, their potential impacts, the context of the contract, and the specific interests or concerns of the user. The risk score could then be presented to the user in a user-friendly format, providing them with a concise, understandable measure of the potential risks associated with the contract modifications.

Illustrative embodiments provide for presenting the risk score to a user. Presenting may involve use of a software module, such as a web browser or mobile application, that can interact with the user interface, display information, or perform specific functions. For instance, the risk score could be conveyed to the user through a plugin in their web browser or a feature in their mobile application. This plugin could provide real-time updates on changes in digital contracts, alert the user of the risks associated with these changes, or provide recommendations on how to navigate these changes, among other functions.

Illustrative embodiments include presenting the risk score responsive to a determination that the risk score meets a risk score threshold. This process could involve a threshold algorithm, which may be programmed to initiate an alert mechanism only when the risk score surpasses a predetermined value. For example, in a situation where the risk score scale ranges from 0 (representing no risk) to 1 (indicating the maximum risk), the system might be set up to trigger an alert when the risk score exceeds a value of 0.7. In practice, should a modification in the digital contract generate a risk score of 0.75, this would exceed the threshold value and thus trigger an alert. On the other hand, if the risk score is 0.65, it would not meet the threshold, and no alert would be prompted. In this manner, the threshold algorithm may effectively prioritize the presentation of risk scores, ensuring users are only notified about significant contract changes that could potentially impact them.

Illustrative embodiments provide for presenting an alert to a user of digital contract modifications. An "alert," as used herein, may refer to a system-generated communication designed to notify the user of modifications in a digital contract. They could be generated in real-time, or on a pre-set schedule, based on the settings preferred by the user or defined by the system based on the user's behavior and contract modification patterns. Alerts can be designed in visually conspicuous ways to capture the user's attention and can be customized to suit different platforms and devices, thereby ensuring an effective user experience. They may involve, for instance, notifying the user of changes in digital contracts through a pop-up message, a highlighted text in the digital contract, or by drawing a box around modified contract language, among other suitable methods.

For example, the system might leverage browser-based application programming interfaces (APIs) or app-based notification services to display a pop-up message on the user's device when a significant change in a digital contract is detected. This message could contain a brief, easily digestible summary of the changes, a quantifiable modification level, or a risk score calculated by the system. It may also include actionable advice for further steps the user could take.

Illustrative embodiments provide for use of user data in digital contract modification analysis. "User data," as used herein, may refer to information that pertains to a user's behavior, interactions, preferences, or characteristics. User data may encompass details about a user's profile (such as their location or occupation), interactions with the system (such as their click patterns, time spent on specific sections, or response to previous alerts), and direct or indirect feedback. Specific sections, clauses, or terms within a digital contract may carry more importance for different users.

In some embodiments, for instance, user data may include a user location, and determining the risk assessment of the modification may be based on the user location. Users residing in different parts of the world are subject to various jurisdictional regulations and laws that govern their rights and obligations. For instance, the European Union's General Data Protection Regulation may impact the privacy rights of a user located within its jurisdiction. This diversity in legal frameworks means that changes to a digital contract can bear different implications for users based on their location. Therefore, the system may take a user's location into account when examining contract modifications. By doing so, the system can prioritize identifying and highlighting modifications that significantly affect the rights and obligations applicable to users under their specific jurisdictions. This location-based prioritization ensures that users receive the most relevant and critical updates about their digital contracts, tailored specifically to their legal environment.

As another example, a user might be particularly focused on clauses related to data privacy due to their heightened sensitivity towards their personal data, or another user might prioritize refund policies due to past experiences. The system can accommodate these user preferences by prompting users to specify these areas of interest at the outset, using a combination of user input fields, preference selection tools, or interactive tools. It may then actively monitor these sections in subsequent versions of the digital contract and inform the user if changes occur.

Additionally or alternatively, the system can also take a more proactive approach and learn the user's preferences through the user's interactions with the system. When a user clicks on a specific clause or spends more time on a particular section, for instance, the system can take this as an indication of interest in that area. This learning process might involve machine learning algorithms and/or user behavior analysis techniques that can continuously monitor the user's interactions, analyze patterns, and learn to better tailor the system's responses and alerts to match the user's needs and preferences.

Illustrative embodiments include generating, responsive to the user interacting with an interactive tool, an explanation of the modification using the interactive tool. An "interactive tool," as used herein, may refer to a software application that can interact with users in natural language, understand their questions or commands, or provide appropriate responses. An interactive tool could be developed using a combination of technologies including natural language processing for understanding user input, machine learning for learning from user interactions and improving its responses over time, or a user-friendly interface design to facilitate easy interaction, among other functions. For instance, the system could include a chatbot that helps users understand the changes in a digital contract, explains the potential implications of these changes, and answers any questions the user might have, among other functions. For example, a user might ask the chatbot why a certain clause in the contract has changed, what the new clause means, and how it could impact their use of the product or service. The chatbot could provide a plain-language explanation, suggest further resources for the user, or advise the user based on a risk score.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The process software for adaptive analysis of digital contract modifications is integrated into a client, server and network environment, by providing for the process software to coexist with applications, operating systems and network operating systems software and then installing the process software on the clients and servers in the environment where the process software will function.

The integration process identifies any software on the clients and servers, including the network operating system where the process software will be deployed, that are required by the process software or that work in conjunction with the process software. This includes software in the network operating system that enhances a basic operating system by adding networking features. The software applications and version numbers will be identified and compared to the list of software applications and version numbers that have been tested to work with the process software. Those software applications that are missing or that do not match the correct version will be updated with those having the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems, including the network operating systems, will be identified and compared to the list of operating systems, version numbers and network software that have been tested to work with the process software. Those operating systems, version numbers and network software that do not match the list of tested operating systems and version numbers will be updated on the clients and servers in order to reach the required level.

After ensuring that the software, where the process software is to be deployed, is at the correct version level that has been tested to work with the process software, the integration is completed by installing the process software on the clients and servers.

With reference to FIG. 1, this figure depicts a block diagram of a computing environment 100. Computing environment 100 contains an example of an environment for the execution of at least some of the computer code involved in performing the inventive methods, such as digital contract modification analysis engine 200 for adaptive analysis of digital contract modifications. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
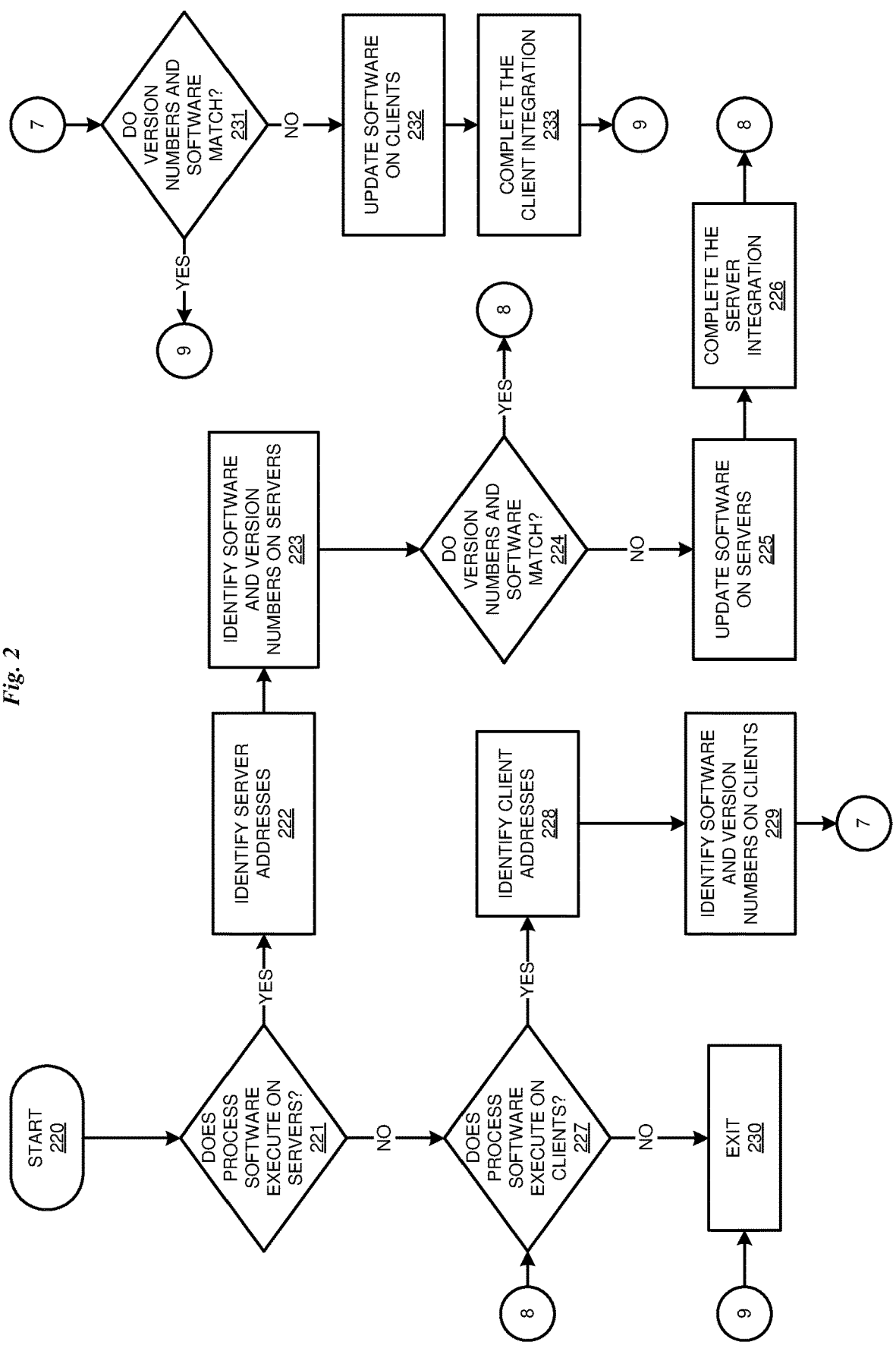
FIG. 2 depicts a block diagram of an example software integration process in accordance with an illustrative embodiment.

With reference to FIG. 2, this figure depicts a block diagram of an example software integration process, which various illustrative embodiments may implement. Step 220 begins the integration of the process software. An initial step is to determine if there are any process software programs that will execute on a server or servers (221). If this is not the case, then integration proceeds to 227. If this is the case, then the server addresses are identified (222). The servers are checked to see if they contain software that includes the operating system (OS), applications, and network operating systems (NOS), together with their version numbers that have been tested with the process software (223). The servers are also checked to determine if there is any missing software that is required by the process software (223).

A determination is made if the version numbers match the version numbers of OS, applications, and NOS that have been tested with the process software (224). If all of the versions match and there is no missing required software, the integration continues (227).

If one or more of the version numbers do not match, then the unmatched versions are updated on the server or servers with the correct versions (225). Additionally, if there is missing required software, then it is updated on the server or servers (225). The server integration is completed by installing the process software (226).

Step 227 (which follows 221, 224 or 226) determines if there are any programs of the process software that will execute on the clients. If no process software programs execute on the clients, the integration proceeds to 230 and exits. If this not the case, then the client addresses are identified (228).

The clients are checked to see if they contain software that includes the operating system (OS), applications, and network operating systems (NOS), together with their version numbers that have been tested with the process software (229). The clients are also checked to determine if there is any missing software that is required by the process software (229).

A determination is made if the version numbers match the version numbers of OS, applications, and NOS that have been tested with the process software (231). If all of the versions match and there is no missing required software, then the integration proceeds to 230 and exits.

If one or more of the version numbers do not match, then the unmatched versions are updated on the clients with the correct versions 232. In addition, if there is missing required software, then it is updated on the clients 232. The client integration is completed by installing the process software on the clients 233. The integration proceeds to 230 and exits.

Figure 3:
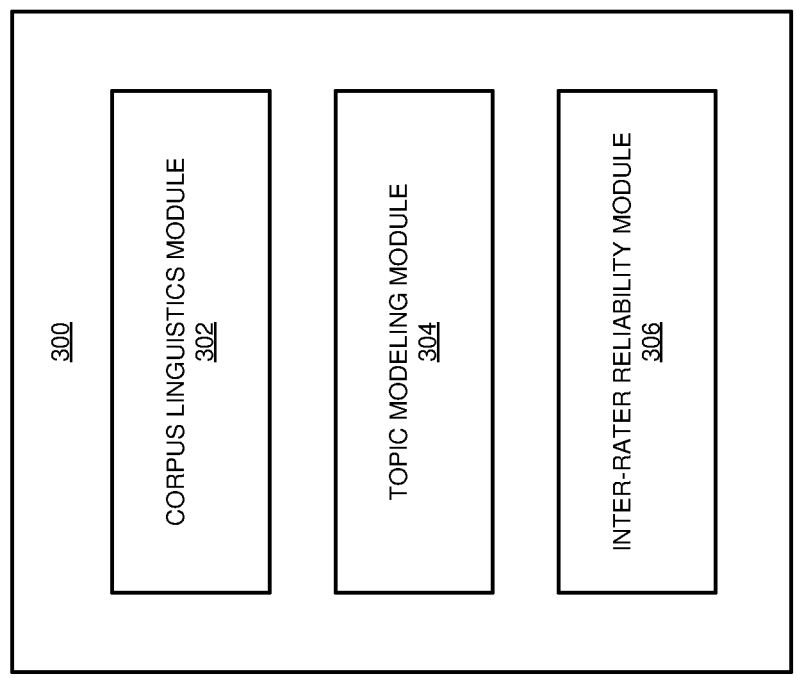
FIG. 3 depicts a block diagram of an example digital contract modification analysis engine in accordance with an illustrative embodiment.

With reference to FIG. 3, this figure depicts a block diagram of an example digital contract modification analysis engine 300, which various illustrative embodiments may implement. It is to be understood that the digital contract modification analysis engine 300 may be implemented as a single unit or as a part of a larger system in which computer-usable program code or instructions implementing the processes may be located for the illustrative embodiments. In addition, a digital contract modification analysis engine may comprise additional or fewer components than those shown in the illustrative embodiment.

In the depicted example, digital contract modification analysis engine 300 may comprise a corpus linguistics module 302, a topic modeling module 304, and an inter-rater reliability module 306. These specialized modules may work in tandem to analyze both the initial and subsequent software terms and conditions, facilitating the core functionality of the engine.

Corpus linguistics module 302 may be configured to apply one or more corpus linguistics techniques to a digital contract. Corpus linguistics, which involves the study of language as expressed in corpora (samples) of "real world" text, could be employed to explore patterns, usage, and other linguistic characteristics in the digital contract. The techniques could be used to analyze the contract's language in depth, examining its structure, vocabulary, and semantic aspects among others. This module's potential to apply corpus linguistics techniques may enable an in-depth understanding and analysis of the contract text, providing a robust foundation for subsequent processing or decision-making stages.

Topic modeling module 304 may be configured to identify topics or themes within the digital contract. It may employ, for instance, algorithms or machine learning techniques like Latent Dirichlet Allocation (LDA) and/or Gibbs sampling, to discern topics or themes within the contractual terms. For example, it could identify topics such as data privacy, refund policies, or dispute resolution procedures. As these themes shift from the initial to subsequent versions of the terms, the module may aid in quantifying the degree of modification and risk. Thus, the topic modeling module 304 may serve as the engine's modification and risk radar, scanning and flagging potential areas of concern within the updated terms.

Inter-rater reliability module 306 may be configured to evaluate the degree of agreement between different digital contracts or different ratings of the same contract. For instance, this module could apply a statistical measure such as Cohen's Kappa, although any other statistical technique may be applied. The use of Cohen's Kappa may facilitate the measurement of inter-rater agreement for textual terms in both the initial digital contract and any subsequent modifications. This statistical tool may quantify the degree of consensus between two or more digital contracts, taking into account the possibility of agreement occurring by chance.

In some embodiments, the corpus linguistics module 302, the topic modeling module 304, and the inter-rater reliability module 306 may be part of a machine learning model. The process of training the machine learning model may involve multiple iterative steps designed to enhance the model's predictive capabilities and performance over time. Initially, the model may be fed a company's or service's initial contract, which may serve as a foundation from which the risk of subsequent modifications (e.g., a month or a year after the initial contract) may be judged. In some embodiments, however, the model may be fed with a dataset of multiple digital contracts and their respective modifications and risks, which may allow the model to learn the intricacies of contractual language, modifications, and associated risks. The model may utilize the functions of the corpus linguistics module 302 to understand the contractual terms, followed by the topic modeling module 304 to understand the underlying topics. The inter-rater reliability module 306 may be used to determine an agreement between different versions of the digital contract, or it may be used to ensure consistency in the model's output. Through the iterations, the model continuously may adjust and optimize its parameters to reduce the difference between its predictions and the actual outcomes, a process known as minimizing the loss function. This learning approach, coupled with the modules' functionalities, may allow the machine learning model to iteratively learn and improve. It is to be understood that any other suitable process for training the machine learning model may be employed.

Figure 4:
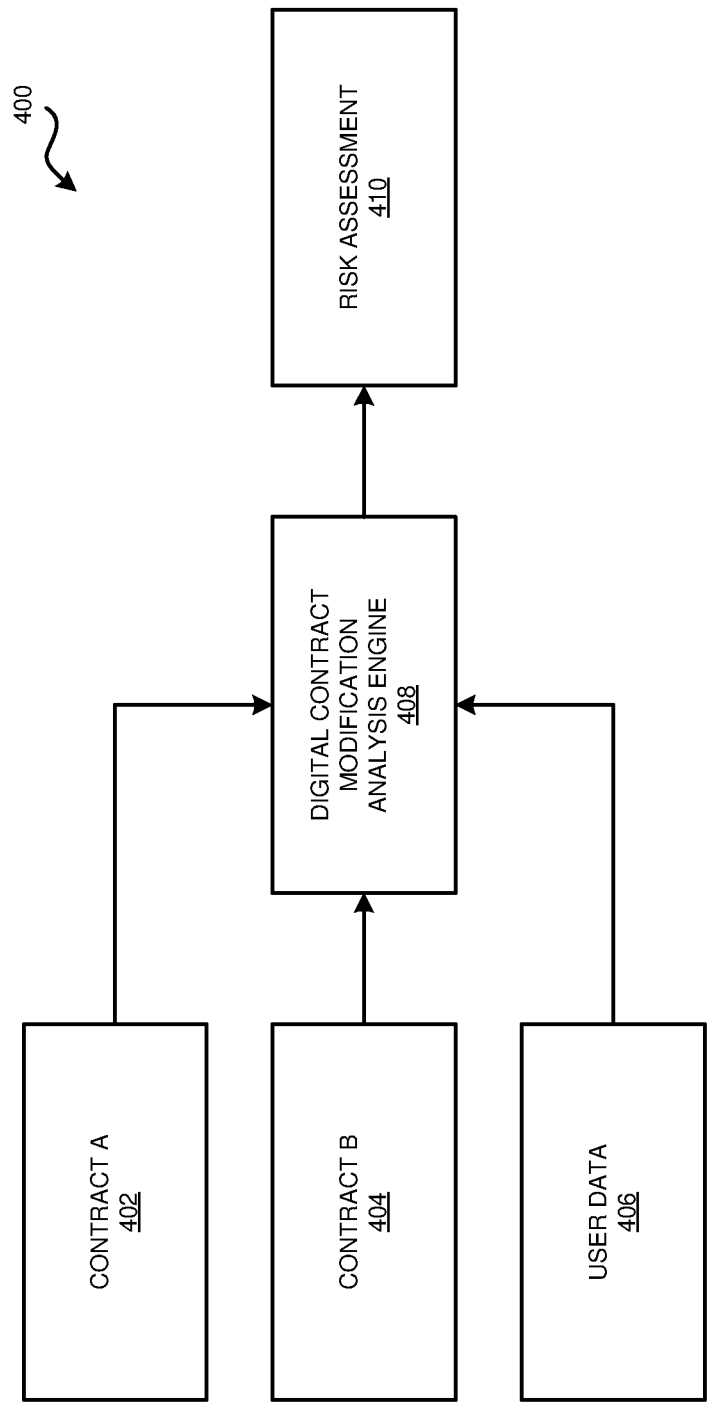
FIG. 4 depicts a block diagram of an example process for adaptive analysis of digital contract modifications in accordance with an illustrative embodiment.

With reference to FIG. 4, this figure depicts a block diagram of an example process for adaptive analysis of digital contract modifications in accordance with an illustrative embodiment 400.

In the illustrative embodiment, contract 402 may represent a digital contract (Contract A). This contract may represent the original set of terms and conditions that are destined to undergo modifications. Contract A could encompass a wide array of clauses and conditions that detail the agreement between two parties, such as a software company and an end-user. The contract may be delivered in a digital format, allowing the system to access, read, process, and interpret its content using appropriate algorithms and computational linguistics techniques.

Contract 404 may represent another digital contract (Contract B). This contract may be an updated version of Contract A, encompassing all the modifications such as additions, deletions, or alterations made to the original contract. The changes that occur between Contract A and Contract B may be determined by the system's analysis. Techniques like semantic analysis and differential analysis may be used to ascertain and quantify these changes.

User data 406 may represent user-specific information that is integrated into the system. This data could contain details about a user's preferences, behavior, interactions, and characteristics, among others. For instance, if a user is particularly concerned about data privacy, this preference may be considered. The system may use this data to tailor the analysis, emphasizing the areas of special concern to the user, and customizing the alerts, notifications, and other user interactions accordingly.

Digital contract modification analysis engine 408 may represent a specialized system configured to discern and evaluate modifications in digital contracts. For instance, this module could utilize one or more machine learning algorithms, linguistic analysis, topic modeling, and/or statistical analysis techniques to perform its functions with precision and efficiency, as explained herein. The module may ingest data from multiple sources, such as digital contracts, user data sources, databases, and any other suitable source of information, to derive insights about digital contract modifications and their potential risks.

As depicted, contract 402, contract 404, and user data 406 may be fed to digital contract modification analysis engine 408. This module may be configured to process these data inputs, leveraging its computational and analytical capabilities to identify modifications, understand their implications, and assess associated risks in the context of digital contracts. Various algorithms for text mining, change detection, and risk assessment, among others, may be used in this step.

Risk assessment 410 may represent the output of digital contract modification analysis engine 408. This output may represent the modifications identified in the contract, the potential risks associated with these changes, and other findings from the analysis. The system could present this output in different formats, such as a comprehensive report detailing each change, a risk score indicating the overall risk level of the changes, or a change summary highlighting the key modifications, among others. These outputs could be further personalized based on the user's preferences or specific needs, enhancing the system's effectiveness and user-centric nature.

Figure 5:
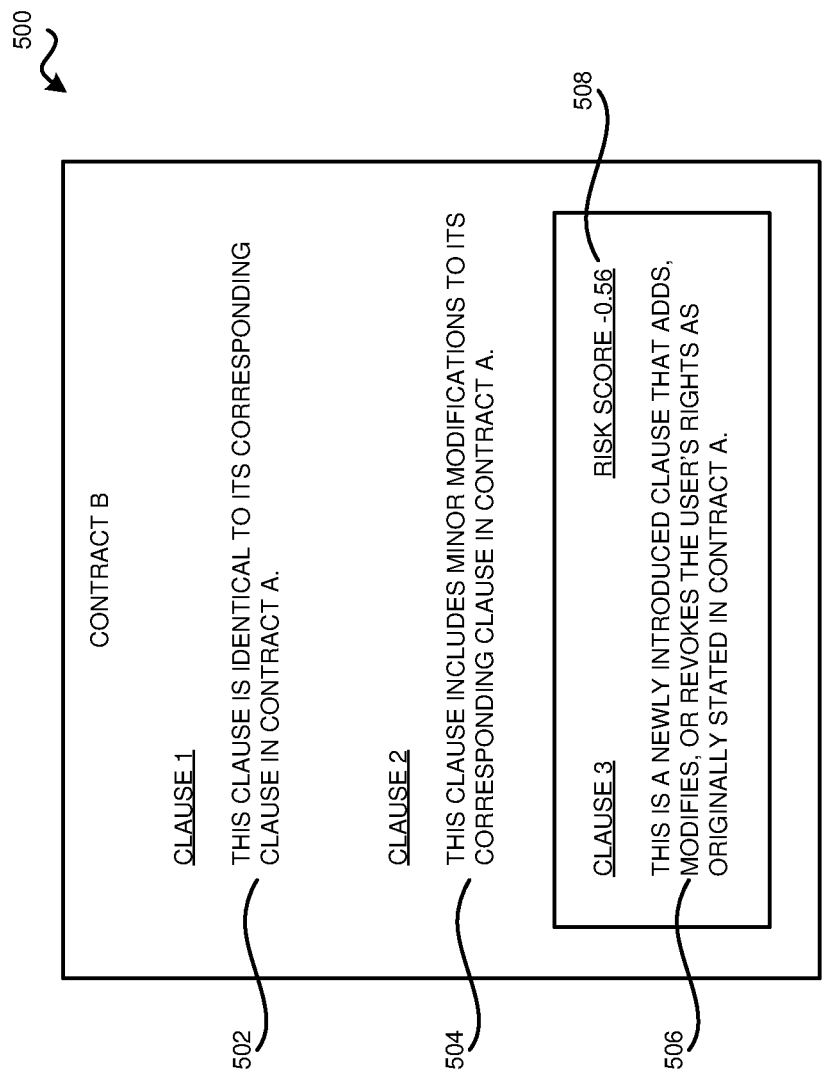
FIG. 5 depicts a block diagram of an example modified digital contract in accordance with an illustrative embodiment.

With reference to FIG. 5, this figure depicts a block diagram of an example modified digital contract 500. As shown, modified digital contract 500 may include one or more clauses, such as clauses 502, 504, and 506. Each clause could be structured as a unit of information containing distinct conditions, rights, obligations, or policies that form the basis of the contractual relationship. The contractual domain could span a wide array, from technology services to digital content subscriptions, establishing the rules of engagement between the service provider and the user.

Clause 502 may be a clause that is identical to the original digital contract. This may imply that no modifications, either subtle or substantial, have been made to the content or intent of this clause during the contract's update. This clause could pertain to a universally accepted contractual term, such as the governing law, or a mutually agreed clause that has remained consistent through a previous iteration of the contract. Owing to its unmodified nature, the system may maintain clause 502 without any alterations.

Clause 504 may be a clause that includes minor modifications to its corresponding clause in the original digital contract. These modifications might be trivial changes in phrasing or terminology that do not significantly impact the clause's intent or interpretation. For instance, the alteration might be as simple as changing "party A and party B" to "participant A and participant B" or updating a date or time without changing the overall schedule. The system may be designed to make these minor modifications noticeable to the user. It could use various methods such as color-coding the changes, underlining them, or annotating them with notes. However, the system could also overlook these minor modifications based on predefined user preferences or other considerations. The decision to highlight might depend on individual user preferences, collected through user profiles or interactive user feedback, allowing for a personalized user experience.

Clause 506 may be a clause that adds, modifies, or revokes the user's rights as stated in the original contract. A clause of this nature could affect the balance of rights and obligations, such as a change in data privacy rights, payment terms, or service guarantees. The system may be designed to make these changes stand out. As exemplified in the diagram, the system may employ various visual cues like drawing a box around the changed section. However, the method of drawing attention can be adaptable, considering factors such as user interface design, user preferences, accessibility guidelines, or the device on which the contract is being read. For example, the system may change the font color or add a blinking effect to signify important modifications.

In addition to highlighting the modifications, the system may also present relevant details associated with the change, such as risk score 508. In the example provided, for instance, the system assigns a risk score of −0.56, signaling a modification unfavorable from the user's perspective. In contrast, a modification beneficial to the user might reflect a positive risk score, for example, 0.92. These risk scores, ranging from −1 to +1 in the depicted example (though any other range may be used), provide a quick overview of the changes' impact. Other embodiments might use different representations, such as an "A" to "F" grading system or a color-coded scoring, where red signifies a high-risk change and green denotes a low-risk one. These intuitive scoring methods can assist users in quickly understanding and evaluating the significance and potential impact of contractual modifications.

With reference to FIG. 6, this figure depicts a block diagram of an example process for adaptive analysis of digital contract modifications in accordance with an illustrative embodiment 600. The example block diagram of FIG. 6 may be implemented using digital contract modification analysis engine 200 of FIG. 1.

In the illustrative embodiment, at block 602, the process performs a modification analysis between a first digital contract and a second digital contract. At block 604, the process identifies a modification based on the modification analysis. At block 606, the process determines, based on user data associated with a user, a risk assessment of the modification. It is to be understood that steps may be skipped, modified, or repeated in the illustrative embodiment. Moreover, the order of the blocks shown is not intended to require the blocks to be performed in the order shown, or any particular order.

The following definitions and abbreviations are to be used for the interpretation of the claims and the specification. As used herein, the terms "comprises," "comprising," "includes." "including." "has." "having." "contains" or "containing." or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially." "approximately." and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   training a machine learning model to compare a set of natural language (NL) documents, the training comprising:
   executing a calibration phase of the training, comprising enabling the machine learning model to identify a set of patterns in a document in the set of documents, the calibration phase producing a contract modification model;
   executing the contract modification model in an analysis phase, comprising:
   executing the contract modification model with an interactive digital contracts analysis application (application), wherein the application is in data communication with a user device to present an artifact on a graphical user interface (GUI) of the user device;
   operating the contract modification model using a first digital contract (K1) and a second digital contract (K2) as model inputs, the operating performing a modification analysis and outputting a set of changes between the K1 and the K2;
   further outputting from the operating as a part of the modification analysis, a level of change between the K1 and the K2, the level of change forming a modification based on the modification analysis;
   sending from the application, to the GUI the artifact, the artifact comprising an interactive presentation of a risk assessment of the modification based on user data associated with a user; and
   generating on the GUI, responsive to the user interacting with the artifact on the GUI, an explanation of the modification.

2. The method of claim 1, wherein the first digital contract is a former version of a contract, and the second digital contract is a subsequent version of the contract.

3. The method of claim 1, wherein performing the modification analysis of the first digital contract and the second digital contract includes:
   performing a corpus linguistics analysis of the first digital contract and the second digital contract;
   performing a topic modeling analysis of the first digital contract and the second digital contract; and
   performing an inter-rater reliability analysis of the first digital contract and the second digital contract.

4. The method of claim 1, wherein performing the risk assessment includes determining a risk score associated with the modification.

5. The method of claim 4, further comprising presenting the risk score responsive to a determination that the risk score meets a risk score threshold.

6. The method of claim 1, wherein the user data comprises a user location, and wherein determining the risk assessment of the modification is based on the user location.

7. The method of claim 6, further comprising determining the risk assessment of the modification using a machine learning model trained using an initial version of a contract associated with the first digital contract and the second digital contract.

8. The method of claim 1, wherein the generating, is performed by an interactive tool.

9. The method of claim 8, wherein the interactive tool is a chatbot.

10. A computer program product comprising one or more computer readable storage media, and program instructions collectively stored on the one or more computer readable storage media, the program instructions executable by a processor to cause the processor to perform operations comprising:
    training a machine learning model to compare a set of natural language (NL) documents, the training comprising:
    executing a calibration phase of the training, comprising enabling the machine learning model to identify a set of patterns in a document in the set of documents, the calibration phase producing a contract modification model;
    executing the contract modification model in an analysis phase, comprising:
    executing the contract modification model with an interactive digital contracts analysis application (application), wherein the application is in data communication with a user device to present an artifact on a graphical user interface (GUI) of the user device;
    operating the contract modification model using a first digital contract (K1) and a second digital contract (K2) as model inputs, the operating performing a modification analysis and outputting a set of changes between the K1 and the K2;
    further outputting from the operating as a part of the modification analysis, a level of change between the K1 and the K2, the level of change forming a modification based on the modification analysis;
    sending from the application, to the GUI the artifact, the artifact comprising an interactive presentation of a risk assessment of the modification based on user data associated with a user; and
    generating on the GUI, responsive to the user interacting with the artifact on the GUI, an explanation of the modification.

11. The computer program product of claim 10, wherein the first digital contract is a former version of a contract, and the second digital contract is a subsequent version of the contract.

12. The computer program product of claim 10, wherein performing the modification analysis of the first digital contract and the second digital contract includes:
    performing a corpus linguistics analysis of the first digital contract and the second digital contract
    performing a topic modeling analysis of the first digital contract and the second digital contract; and
    performing an inter-rater reliability analysis of the first digital contract and the second digital contract.

13. The computer program product of claim 10, wherein performing the risk assessment includes determining a risk score associated with the modification, further comprising presenting the risk score responsive to a determination that the risk score meets a risk score threshold.

14. The computer program product of claim 10, wherein the user data comprises a user location, and wherein determining the risk assessment of the modification is based on the user location, further comprising determining the risk assessment of the modification using a machine learning model trained using an initial version of a contract associated with the first digital contract and the second digital contract.

15. The computer program product of claim 10, wherein the generating is performed by an interactive tool.

16. A computer system comprising a processor and one or more computer readable storage media, and program instructions collectively stored on the one or more computer readable storage media, the program instructions executable by the processor to cause the processor to perform operations comprising:
   training a machine learning model to compare a set of natural language (NL) documents, the training comprising:
      executing a calibration phase of the training, comprising enabling the machine learning model to identify a set of patterns in a document in the set of documents, the calibration phase producing a contract modification model;
   executing the contract modification model in an analysis phase, comprising:
      executing the contract modification model with an interactive digital contracts analysis application (application), wherein the application is in data communication with a user device to present an artifact on a graphical user interface (GUI) of the user device;
      operating the contract modification model using a first digital contract (K1) and a second digital contract (K2) as model inputs, the operating performing a modification analysis and outputting a set of changes between the K1 and the K2;
      further outputting from the operating as a part of the modification analysis, a level of change between the K1 and the K2, the level of change forming a modification based on the modification analysis;
      sending from the application, to the GUI the artifact, the artifact comprising an interactive presentation of a risk assessment of the modification based on user data associated with a user; and
      generating on the GUI, responsive to the user interacting with the artifact on the GUI, an explanation of the modification.

17. The computer system of claim 16, wherein the first digital contract is a former version of a contract, and the second digital contract is a subsequent version of the contract.

18. The computer system of claim 16, wherein performing the modification analysis of the first digital contract and the second digital contract includes:
   performing a corpus linguistics analysis of the first digital contract and the second digital contract performing a topic modeling analysis of the first digital contract and the second digital contract; and
   performing an inter-rater reliability analysis of the first digital contract and the second digital contract.

19. The computer system of claim 16, wherein performing the risk assessment includes determining a risk score associated with the modification, further comprising presenting the risk score responsive to a determination that the risk score meets a risk score threshold.

20. The computer system of claim 16, wherein the user data comprises a user location, and wherein determining the risk assessment of the modification is based on the user location, further comprising determining the risk assessment of the modification using a machine learning model trained using an initial version of a contract associated with the first digital contract and the second digital contract.

* * * * *